United States Patent
Schmidt et al.

(10) Patent No.: US 12,330,441 B2
(45) Date of Patent: Jun. 17, 2025

(54) MULTIPLE COLOR IMAGE (71) Applicant: THALES DIS FRANCE SAS, Meudon (FR)

(72) Inventors: Gregor Schmidt, Meudon (FR); Thomas Neuenschwander, Meudon (FR); Christian Sailer, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 746 days.

(21) Appl. No.: 17/292,442

(22) PCT Filed: Nov. 8, 2019

(86) PCT No.: PCT/EP2019/080683
§ 371 (c)(1),
(2) Date: May 9, 2021

(87) PCT Pub. No.: WO2020/094842
PCT Pub. Date: May 14, 2020

(65) Prior Publication Data
US 2021/0370704 A1 Dec. 2, 2021

(30) Foreign Application Priority Data
Nov. 9, 2018 (EP) ..................................... 18205397

(51) Int. Cl.
B42D 25/324 (2014.01)
B42D 25/23 (2014.01)
(Continued)

(52) U.S. Cl.
CPC ......... B42D 25/324 (2014.10); B42D 25/373 (2014.10); B42D 25/435 (2014.10);
(Continued)

(58) Field of Classification Search
CPC .. B42D 25/324; B42D 25/373; B42D 25/435; B42D 25/23; B42D 25/24; B42D 25/346; G06K 19/07722; G06K 19/077
(Continued)

(56) References Cited

U.S. PATENT DOCUMENTS

2005/0141094 A1 6/2005 Wild et al.
2009/0008926 A1 1/2009 Depta et al.
(Continued)

FOREIGN PATENT DOCUMENTS

EP 2109014 A1 10/2009
WO WO03095228 A1 11/2003
(Continued)

OTHER PUBLICATIONS

PCT/EP2019/080683, International Search Report, Jan. 21, 2020, European Patent Office, P.B. 5818 Patentlaan 2. NL-2280 HV Rijswijk.
(Continued)

Primary Examiner — Justin V Lewis (57) ABSTRACT

A data carrier with a cover layer, a base layer, and an information layer arrangement. The information layer arrangement includes at least a first information layer and a second information layer arranged after the first information layer along an extension direction. The first information layer and the second information layer have different optical properties, and the information layer arrangement has an unmodified region and at least one modified region, the at least one modified region having at least one recess extending at least partially into the first information layer along the extension direction. The at least one modified region is configured to reflect incident electromagnetic waves whereby a first reflection spectrum is generated, the unmodified region is configured to reflect said incident electromagnetic waves whereby a first reflection spectrum is generated, the unmodified region is configured to reflect said incident electromag-
(Continued)

netic waves whereby a second reflection spectrum is generated, the first reflection spectrum being different from the second reflection spectrum.

24 Claims, 4 Drawing Sheets (51) Int. Cl.
*B42D 25/24* (2014.01)
*B42D 25/373* (2014.01)
*B42D 25/435* (2014.01)
*G06K 19/077* (2006.01)

(52) U.S. Cl.
CPC ........ *G06K 19/07722* (2013.01); *B42D 25/23* (2014.10); *B42D 25/24* (2014.10)

(58) Field of Classification Search
USPC .................... 283/67, 69, 72, 91, 94, 98, 901
See application file for complete search history.

(56) References Cited

U.S. PATENT DOCUMENTS

| | | | | |
|---|---|---|---|---|
| 2009/0251749 | A1* | 10/2009 | O'Boyle | B32B 15/00 359/2 |
| 2011/0012337 | A1* | 1/2011 | Heim | B42D 25/29 428/29 |

FOREIGN PATENT DOCUMENTS

| | | |
|---|---|---|
| WO | WO2005108110 A1 | 11/2005 |
| WO | WO2009109291 A1 | 9/2009 |

OTHER PUBLICATIONS

PCT/EP2019/080683, Written Opinion of the International Searching Authority, Jan. 21, 2020, European Patent Office, P.B. 5818 Patentlaan 2, NL-2280 HV Rijswijk.

* cited by examiner

MULTIPLE COLOR IMAGE

TECHNICAL FIELD

The present invention relates to a data carrier according to the preamble of claim 1, a security document comprising such a data carrier according to claim 11 and a method of producing such a data carrier according to claim 12.

PRIOR ART

A wide variety of measures in order to protect data carriers such as identity cards, passports, bank cards, etc., from forgers are known in the art. As such, the provision of security elements comprising data which is assigned to an individual person owning the data carrier is common. These may include personalized data such as a name, a date of birth or a photo of the owner. When a data carrier is stolen a forger usually tries to modify or replace the personalized data on the stolen card. It is therefore an aim to prevent or at least complicate the modification or replacement of these data.

From EP 2 756 963 A1 a multilayer data carrier is known which comprises a metallized thin layer arranged between layers of thermoplastic. During personalization of the card, i.e. when data of the data carrier holder is written onto the data carrier, the metal layer is partially ablated, wherein text or images are generated.

In order to generate personalized data being high in contrast, WO 2016/030315 A1 discloses the provision of a color pattern within a document body. The color pattern comprises different color fields which are applied to a surface of a substrate by means of offset or inkjet printing technologies. Disadvantages associated with printing technologies are a limited resolution of the printing technology and a constant CMY hue generated in the background.

SUMMARY OF THE INVENTION

It is an object of the present invention to provide a data carrier having a higher level of security. In particular, it is an object to provide a data carrier comprising contrasty and preferably colored information.

This object is achieved with a data carrier according to claim 1. That is, a data carrier is provided which comprises a cover layer, a base layer, and an information layer arrangement. The information layer arrangement is arranged between the cover layer and the base layer and comprises at least two information layers, wherein a first information layer of the at least two information layers is arranged after the cover layer and a second information layer of the at least two information layers is arranged after the first information layer along an extension direction. The first information layer and the second information layer have different optical properties, and the information layer arrangement has an unmodified region and at least one modified region, the at least one modified region having at least one recess extending at least partially into the first information layer along the extension direction. The at least one modified region is configured to reflect incident electromagnetic waves whereby a first reflection spectrum is generated, wherein the unmodified region is configured to reflect said incident electromagnetic waves whereby a second reflection spectrum is generated, and wherein the first reflection spectrum is different from the second reflection spectrum.

That is to say, the at least one modified region and the unmodified region have different properties that lead to different reflection spectra. In the context of the present invention the expression "spectrum" refers to electromagnetic waves of one or more wavelengths and of one or more intensities. The properties of the electromagnetic waves are determined by their origin, i.e. by the source they are emitted from. In principle, a monochromatic source such as a laser could be used to illuminate or investigate the data carrier, wherein electromagnetic waves of one particular wavelength and of one particular intensity are incident on the data carrier. Due to the different properties of the unmodified region and the at least one modified region, the electromagnetic waves reflected from the at least one modified region, i.e. the first reflection spectrum, can have a different wavelength and/or a different intensity than the electromagnetic waves reflected from the unmodified region, i.e. the second reflection spectrum. However, it is likewise conceivable that the electromagnetic waves originate from ambient light such as daylight or from a light source such as a bulb comprising two or more different wavelengths of the same or of different intensities, wherein electromagnetic waves of two or more different wavelengths of the same or of different intensities are incident on the data carrier. In this case, the electromagnetic waves reflected from the at least one modified region, i.e. the first reflection spectrum, can have one or more wavelengths and/or one or more intensities that differ from the electromagnetic waves reflected from the unmodified region, i.e. the second reflection spectrum. In this context it is important to note that the at least one modified and the unmodified region are impinged with electromagnetic waves of the same one or more wavelengths and the same one or more different intensities and that the reflection of these electromagnetic waves from the at least one modified region and the unmodified region occurring thereupon is different. The generation of reflected electromagnetic waves of different wavelengths and/or intensities is due to, amongst others, the different optical properties of the first and the second information layer. As a result, it is conceivable that the properties of the at least one modified region and the unmodified region are such, that electromagnetic waves being incident on the at least one modified region are reflected with a wavelength (or wavelengths) and/or an intensity (or intensities) being different from the wavelength (or wavelengths) and/or intensity (or intensities) of the reflected electromagnetic waves that were incident on the unmodified region. Or in other words, the reflection spectra can differ in their wavelength distribution and/or their intensity distribution.

The generation of reflected electromagnetic waves of different wavelengths and/or of different intensities gives contrast and, depending on the wavelengths and/or intensities, a colorful impression to the data carrier, whereby the security of the data carrier is enhanced. To this end it is therefore particularly preferred to impinge the data carrier with electromagnetic waves constituting a continuous spectrum, i.e. with light of all wavelengths.

The at least one modified region, potentially together with the unmodified region, preferably represent personalized data such as a graphical data, e.g. an image or a logo, or alphanumerical data, such as a name or a date of birth of the owner or machine-readable data, such as a barcode, respectively. That is, the data carrier can be personalized by the provision of one or more recesses of a particular arrangement and of a particular configuration in the information layer arrangement. Here, the particular arrangement refers to the localization of the one or more recesses with respect to a plane running parallel to a surface of the information layer arrangement, and the particular configuration refers to the depth of the one or more recesses along the extension direction running perpendicular to the said plane.

Moreover, it is preferred that the information layer arrangement comprises two or more modified regions each having one or more recess. The one or more recesses can extent to the same amount or to different amounts into the information layer arrangement along the extension direction. Depending on the optical properties of the information layers and the arrangement and configuration of the one or more recesses a wide range of data can be created. Even complex data such as colored images are possible.

The different optical properties can be at least one of a different refractive index, a different color appearance, a different absorption behavior, a different reflection behavior, or combinations thereof. That is, it is preferred that the first information layer and the second information layer differ in one or more of its refractive index, its different color appearance, its absorption behavior, its reflection behavior, or combinations thereof.

If, for example, the first information layer has a blue appearance and the second information layer has a red appearance, then a recess extending completely through the first information layer would reveal the blue second information layer such that the data carrier appears in two colors, with the unmodified region appearing blue and the modified region appearing red. The same applies if the first and second information layers differ in their absorbing or reflecting properties. Depending on the wavelength of the incident electromagnetic waves, the different absorbing behavior or property and the different reflection behavior or property of the first and second information layer lead to a different appearance of the first information layer and the second information layer and thus of the data carrier. If the first and second information layers differ in their refractive indices, a different appearance is generated due to the different refraction of the incident electromagnetic waves in the first and the second information layer. Depending on the thicknesses of the information layers, a different refractive index can also result in a different appearance due to interference phenomena occurring within the information layer arrangement. This phenomenon is also known as thin-film interference. Layers that are produced by thin-film technologies such as a chemical or physical vapor deposition have a layer thickness which lies in the wavelength or sub-wavelength region of optically visible light that is in the magnitude of a few 100 nanometers, preferably thinner. An interference of electromagnetic radiation or waves can occur at such layers provided that a change in the refractive index is present at the interface of the layers and that part of the electromagnetic radiation can be reflected. This reflectivity in dependence of the index of refraction is described by the law of reflection and the Fresnel equations. Hence, the combination of two or more of such layers results in part of the incident electromagnetic radiation or waves being reflected and part of the electromagnetic radiation or waves being transmitted. Depending on the thickness of the layers and the direction of the refractive index transition these partial reflections can be amplified or cancelled. There is a relationship between the phase position of the partial beam and the wavelength and the thickness of the layer, wherein a phase shift of $\pi$ results in a maximal extinction or amplification of the amplitude. This means that the reflection at the wavelength $\lambda$ is maximally changed if an information layer having a thickness of $\lambda/4$ is used. A high reflection at an interface is achieved if there is a high difference in the refractive indices. As will be explained further below, it is thus preferred to use information layers such as certain metal- or non-metal-compounds which additionally have a high absorption freedom.

The second information layer and the first information layer in the region of the unmodified region or the first information layer in the region of the at least one modified region can have the same thickness along the extension direction. Alternatively, the second information layer and the first information layer in the region of the unmodified region or the first information layer in the region of the at least one modified region can have a different thickness along the extension direction. As has been outlined above, the thickness of the information layers can be used to adjust the interference phenomena and as a result the appearance of the information layers.

The recess can extend completely through the first information layer and preferably at least partially into the second information layer along the extension direction.

A recess extending completely through the first information layer and possibly also at least partly into the second information layer is advantageous if the first and second information layers have a non-transparent but colored appearance, wherein the colored appearance of the second information layer shall be made visible in the data carrier. If the first and second information layers differ in their refractive indices it is possible to provide the information layer arrangement with at least one recess extending only partially into the first information layer but not into the second information layer. In this case the above-described interference phenomena will already result in a different appearance of the data carrier. However, it is also possible to provide the information layer arrangement with at least one recess extending completely through the first and the second information layer. In this case the base layer or, if present, a third information layer arranged after the second information layer along the extension direction is unraveled and the appearance of the data carrier will thus also depend on the appearance of the base layer or the third information layer, respectively.

The first information layer and/or the second information layer can have a refractive index in the range of about 1 to 2.5, preferably in the range of about 1.4 to 2.0. These refractive indices are especially advantageous if the modified and unmodified regions shall have a different appearance due to an interference of the electromagnetic waves.

As has already been mentioned the information layer arrangement can have at least one further modified region, the at least one further modified region having at least one further recess extending at least partially into the first information layer along the extension direction, wherein the at least one further recess extends into the information layer arrangement to the same extent as the at least one recess, or wherein the at least one further recess extends to a lesser extent or to a further extent into the information layer arrangement as the at least one recess.

That is to say, the information layer arrangement can comprise two or more recesses, wherein one or more of these two or more recesses extend at least partly into the first information layer and/or completely through the first information layer and/or completely through the first information layer and at least partly into the second information layer and/or completely through the first and the second information layer. To this end it is also possible that two or more recesses can extent to the same amount or to a different amount into the information layer arrangement along the extension direction. In other words, each of the recesses can be of a particular arrangement and of a particular configuration, wherein said particular arrangement and configuration can be the same or different for some or all of the recesses.

The first information layer and the second information layer can be made of an at least partially reflective material. However, it is also conceivable that the first and second information layers are made of a fully reflective material. In these cases the different colors and the different absorption behaviors and the different reflection behaviors, respectively, are mainly responsible for the appearance of the data carrier.

Alternatively, the first information layer can be made of a dielectric and preferably at least partially transparent material and the second information layer can be made of an at least partially reflective material. In this situation the above-mentioned interference phenomenon can occur, wherein the electromagnetic waves that have entered the transparent first information layer will be reflected on the at least partially reflective second information layer. Alternatively, the first information layer and the second information layer can be made of a dielectric and preferably at least partially transparent material. Also in this case the above-mentioned interference phenomenon will occur. However, the electromagnetic waves that have entered the transparent first information layer and the second information layer will only be reflected if an at least partially reflective material is provided after the second information layer when seen along the extension direction. This could be an at least partially reflective base layer or, as will be explained further below, a third information layer that is at least partially reflective.

The first information layer and/or the second information layer can be made of one or more metals or one or more metal-compounds, preferably of one or more metals selected from Al, Cu, Au, Ag, Ti or combinations thereof and/or preferably of one or more metal-compounds selected from TiN, TiCN, CrN, ZrN, TiZrN, ZrCN, TiC, TiCrN, AlTiN, TiAlN, diamond like carbon or combinations thereof and/or preferably of one or more compounds selected from $SiO_2$, $Al_2O_3$, $CeF_3$, $ZrO_2$, $CeO_2$, ZnS, $TiO_2$, $SiO_xN_y$, or combinations thereof.

With regard to $SiO_xN_y$, it should be noted that refractive indices in the range of about 1.4 to 2.0 can be obtained depending on the ratio of the nitrogen and oxygen atoms present in the compound.

Thus, a dielectric and preferably at least partially transparent information layer is preferably made of $SiO_2$, $Al_2O_3$, $CeF_3$, $ZrO_2$, $CeO_2$, ZnS, $TiO_2$, $SiO_xN_y$, or combinations thereof.

An at least partially reflective information layer is preferably made of Al, Cu, Au, Ag, Ti or combinations thereof, i.e. from a metallic layer, wherein the color of the metal and its associated absorption and reflection behavior is responsible for the appearance of the data carrier. This is of course assuming that the metallic layer has been revealed by one or more recesses in case that the first information layer is not transparent.

Likewise, an at least partially reflective information layer is preferably made of TiN, TiCN, CrN, ZrN, TiZrN, ZrCN, TiC, TiCrN, AlTiN, TiAlN, diamond like carbon or combinations thereof. Layers made from these materials are also referred to as hard material layers or ceramic layers. It should be noted that the color of these materials may be changed depending on the production method. For example, if the layers are applied by a reactive sputtering process, then the color of the produced layer can be changed in dependence of the ratio of the metal and the gas. TiN, for example, is typically golden yellow. By changing the nitrogen content, in practice the pressure of the nitrogen gas and the pressure of another gas used in the sputtering process such as argon gas, other color impressions can be generated.

The cover layer and/or the base layer can be made of plastics, preferably from a polycarbonate or from a polyethylene terephthalate, the cover layer preferably being transparent. A transparent cover layer allows the incident electromagnetic waves to enter the information layer arrangement. A transparent base layer is likewise preferred.

The information layer arrangement preferably has an overall thickness along the extension direction in the unmodified region in the range of about 100 nm to about 5 μm, preferably of about 500 nm to about 3 μm. An individual information layer of the information layer arrangement in each case preferably has a thickness along the extension direction in an unmodified state in the range of about 10 nm to about 1 μm, preferably of about 50 nm to about 600 nm.

The information layer arrangement preferably comprises a third information layer or more information layers, the third information layer or the more information layers being arranged after the second information layer along the extension direction.

That is, it is preferred that the information layer arrangement comprises three or more information layers, wherein these three or more information layers are arranged between the second information layer and the base layer.

It should be understood that explanations provided with respect to the first information layer and the second information layer likewise apply to the third or any further information layer. That is, the third or any further information layers are preferably made of an at least partially reflective material or of a dielectric and preferably at least partially transparent material. In particular, the third or any further information layers can be made of one or more metals or one or more metal-compounds, preferably of one or more metals selected from Al, Cu, Au, Ag, Ti or combinations thereof and/or preferably of one or more metal-compounds selected from TiN, TiCN, CrN, ZrN, TiZrN, ZrCN, TiC, TiCrN, AlTiN, TiAlN, diamond like carbon or combinations thereof. A dielectric and preferably at least partially transparent third or further information layer is preferably made of one or more compounds selected from $SiO_2$, $Al_2O_3$, $CeF_3$, $ZrO_2$, $CeO_2$, ZnS, $TiO_2$, $SiO_xN_y$, or combinations thereof. In case that the first and second information layers are made of a transparent material, it is preferred that the data carrier comprises a third information layer or any further information layer made of an at least partially reflective material. In case that the information layer arrangement comprises a third or any further information layers made from an at least partially reflective material, it is preferred that the data carrier comprises at least one modified region in which at least one recess extends at least until the third information layer or any further information layer along the extension direction so as to unravel the third information layer or any further information layers in this region. Moreover, the third or any further information layers can have the same or a different thickness along the extension direction.

That is to say, the information layer arrangement can comprise a multitude of information layers, wherein the proper adjustment of the vapor deposition process (see below) and the coating parameters such as the information layer thickness and the refractive index enables the creation of a huge quantity of colors. The colors are generated either by the interference phenomena of the transparent information layers or by the absorbing or reflecting properties of the metallic or metal-compound containing information layers.

In doing so it is possible to arrange different information layers of different colors on top of each other. In addition, these information layers can be generated in a way that the absorbing and reflection behaviors of each information layer is the same or different by using information layers of different thicknesses and/or different materials. If the information layer arrangement is provided with several modified regions, i.e. with several recesses that specifically unravel certain information layers of a certain property, then a complex colored image such as the photograph of a human being can be generated.

The data carrier can further comprise an adhesive layer being arranged between the cover layer and the information layer arrangement and/or between the base layer and the information layer arrangement, or the information layer arrangement can immediately adjoin the cover layer and/or the base layer. The adhesive layer can in each case be made on the basis of polyaddition glues, polymerization glues or combinations thereof. Moreover, co-polymers of subgroups of such glues are possible, too. Conceivable polyaddition glues are glues comprising epoxy resins or polyurethane and conceivable polymerization glues are glues comprising cyanoacrylates or methyl methacrylates, respectively. The thickness of the adhesive layer when seen along the extension direction is preferably in the range of about 0.5 micrometer to 30 micrometer, more preferably in the range of about 1 micrometer to 10 micrometer.

Hence, it is possible to attach the information layer arrangement to the cover layer and/or the base layer by means of an adhesive layer that is applied there between. However, it is likewise possible to provide the information layer arrangement directly on the cover layer and/or the base layer. Moreover, the individual information layers of the information layer arrangement are preferably immediately adjoining one another along the extension direction. A direct application of the information layer arrangement on the cover layer and the base layer is achieved by sputtering the materials of the information layers thereon. For example, if the information layer arrangement comprises a first and a second information layer, the second information layer can be sputtered onto the base layer and then the first information layer is PVD-coated (PVD, physical vapor deposition) onto the second information layer.

In a further aspect a security document comprising a data carrier as described above is provided, the security document preferably being an identity card, a passport, a credit card or the like. In the case of a passport for example the data carrier could correspond to a page of the passport, wherein said page is made of plastics, i.e. the cover layer and the base layer, within which the information layer arrangement is arranged. A colored picture of the passport owner can then be provided by means of a particularly modified information layer arrangement, for example. However, other personalized data such as an image or a logo, or alphanumerical data, such as a name or a date of birth of the owner or machine-readable data, such as a barcode (see above) can be provided in colors, too.

In a further aspect a method of producing a data carrier, preferably a data carrier as describe above, is provided, the method comprising the steps of:

Providing a cover layer, a base layer and an information layer arrangement comprising at least a first information layer and a second information layer, the first information layer and the second information layer having different optical properties, and Providing the information layer arrangement with an unmodified region and at least one modified region, wherein the at least one modified region is provided with at least one recess extending at least partially into the first information layer along an extension direction. The at least one modified region is configured to reflect incident electromagnetic waves whereby a first reflection spectrum is generated, wherein the unmodified region is configured to reflect said incident electromagnetic waves whereby a second reflection spectrum is generated, and wherein the first reflection spectrum is different from the second reflection spectrum.

The information layer arrangement preferably comprises two or more information layers as well as a cover layer and a base layer as described above. The explanations provided above with respect to the data carrier thus likewise apply in the context of the method.

The at least one recess is preferably generated by at least one laser, and wherein the at least one laser at least partially ablates the first information layer along the extension direction. That is, the one or more recesses in the one or more information layers are preferably generated in a laser ablation process. In doing so, the data carrier comprising the information layer arrangement is selectively irradiated with laser radiation, wherein the intensity of the laser radiation determines the extension of the recess along the extension direction, i.e. the depth of the recess.

Two or more recesses can be generated successively by using one single laser only. However, it is also conceivable to use two or more lasers simultaneously in order to generate two or more recesses simultaneously. These two or more lasers can be operated with the same or with different laser parameters.

The first information layer and/or the second information layer can be generated by vapor deposition, preferably by sputtering, evaporation, or chemical vapor deposition, particularly preferably by reactive sputtering. If the information layer arrangement comprises three or more information layers, these three or more information layers are preferably generated by vapor deposition, preferably by sputtering, evaporation, or chemical vapor deposition, particularly preferably by reactive sputtering, too. These deposition processes enable a direct deposition of the individual information layers on top of each other.

One possible way of producing the information layer arrangement is a coating of a plastics substrate such as PC (polycarbonate) or PET (polyethylene terephthalate) or PVC (polyvinyl chloride) in a DC magnetron sputtering unit as it is known in the art. In doing so both web coating and individual coating with a rotating drum holder can be used. Information layers of different thicknesses can be obtained by different sputter rates or drum speeds. In the web coating device the coating can be achieved with a power of 1-3 kW and a process pressure of 0.0001-0.001 bar. Argon gas can be used as an ion-forming gas and nitrogen gas and/or oxygen gas can be used as the reactive gas.

The method can further comprise the step of at least partially transferring at least one region of the information layer arrangement onto the base layer in a laser-induced-forward-transfer process, or the method can further comprise the step of providing a masking device having at least one aperture, wherein at least one section of the first information layer and/or the second information layer is applied through said at least one aperture. These further steps are preferred if a partial coating of the substrate is desired.

Hence, a first possible method of producing a partially coated data carrier comprises the steps of:

Providing a carrier layer, a cover layer, a base layer, and an information layer arrangement as described above, wherein the information layer arrangement is arranged on the carrier layer,
  Bringing the carrier layer comprising the information layer arrangement into contact with the base layer,
  Partially transferring one or more sections of the information layer arrangement from the carrier layer onto the base layer by laser irradiation,
  Removing the carrier layer comprising untransferred sections of the information layer arrangement, and
  Arranging the cover layer on the transferred sections of the information layer system.

The information layer system comprises two or more information layers as described above, wherein these two or more information layers are preferably generated on the carrier layer by vapor deposition, preferably by sputtering, evaporation, or chemical vapor deposition, particularly preferably by reactive sputtering.

The information layer system, strictly speaking the first information layer, can be directly applied onto the carrier layer. However, it is also conceivable that a release layer is arranged between the carrier layer and the first information layer. The release layer, which can also be referred to as sacrificial layer, is preferably made of an adhesive material and serves the purpose of facilitating the detachment of the information layer arrangement from the carrier layer upon irradiation.

It is preferred that the transferred section(s) of the information layer system comprise(s) one or more recesses as described above. That is, in a first step at least one modified region comprising at least one recess can be generated in the information layer arrangement arranged on the carrier layer, wherein this at least one modified region reflects incident electromagnetic waves with a reflection spectrum being different from a reflection spectrum being generated by said electromagnetic waves being incident on an unmodified region and being reflected from the unmodified region. In a second step, laser irradiation is irradiated onto the carrier layer and is used to transfer a section of the information layer arrangement comprising the at least one modified region and a section of the information layer arrangement comprising the unmodified region to the base layer. To this end at least one section of the information layer arrangement is transferred from the carrier layer to the base layer by irradiating the carrier layer on a side opposite to the side on which the information layer arrangement is arranged on the carrier layer. The transferred sections of the information layer system in this case result in a partially coated data carrier of different appearances. In this case, an at least partial modification of the information layer system is performed prior to the partial transfer of the information layer system from the carrier layer to the base layer.

However, it is also conceivable to perform an at least partial modification of the information layer system after a partial transfer of the information layer system from the carrier layer to the base layer has been performed. In this case, in a first step, laser irradiation is used to transfer at least one section of the information layer arrangement from the carrier layer to the base layer. In a second step at least one modified region comprising at least one recess can be generated in the transferred sections of the information layer arrangement arranged on the base layer, wherein this at least one modified region reflects incident electromagnetic waves with a reflection spectrum being different from a reflection spectrum generated by said electromagnetic waves being incident on an unmodified region and being reflected from the unmodified region. The transferred sections of the information layer system in this case result in a partially coated data carrier of different appearances.

The process of partially transferring one or more layers from a carrier layer to another substrate such as the base layer here is well known in the art as Laser-induced-forward-transfer (LIFT) process.

A second possible method of producing a partially coated data carrier comprises the steps of:
  Providing a cover layer and a base layer,
  Providing a masking device having at least one aperture,
  Applying one or more sections of an information layer arrangement comprising at least a first information layer and a second information layer as described above to the base layer, wherein at least one section of the first information layer and/or of the second information layer is applied through said at least one aperture, and
  Arranging the cover layer on the one or more sections of the information layer arrangement.

Hence, also in this case the information layer system comprises two or more information layers as described above, wherein these two or more information layers are preferably generated on the base layer by vapor deposition, preferably by sputtering, evaporation, or chemical vapor deposition, particularly preferably by reactive sputtering. Once the one or more sections of the information layer arrangement are deposited on the base layer, it is preferred to generate at least one modified region with at least one recess extending at least partially into one or more sections of the first information layer, wherein the at least one modified region reflects incident electromagnetic waves with a reflection spectrum being different from a reflection spectrum of said electromagnetic waves being incident on an unmodified region and being reflected from the unmodified region. The sections of the information layer system in this case result in a partially coated data carrier of different appearances. The cover layer can be applied to the one or more sections of the information layer arrangement before or after the modification. This whole process is preferably performed within a vacuum chamber of a PVD instrument.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Several embodiments of a data carrier 1 according to the invention are depicted in FIGS. 1 to 8b. Each data carrier 1 comprises a cover layer 2 and a base layer 3, wherein an information layer arrangement 4 comprising two or more information layers 5, 6, 7, 8, 9, 10 is arranged between the cover layer 2 and the base layer 3. The different embodiments shown here mainly differ in the amounts of information layers comprised in the information layer arrangement 4, the composition of the information layers, as well as in the processing of the information layers. This is now explained in greater detail with respect to the individual figures.

Figure 1:
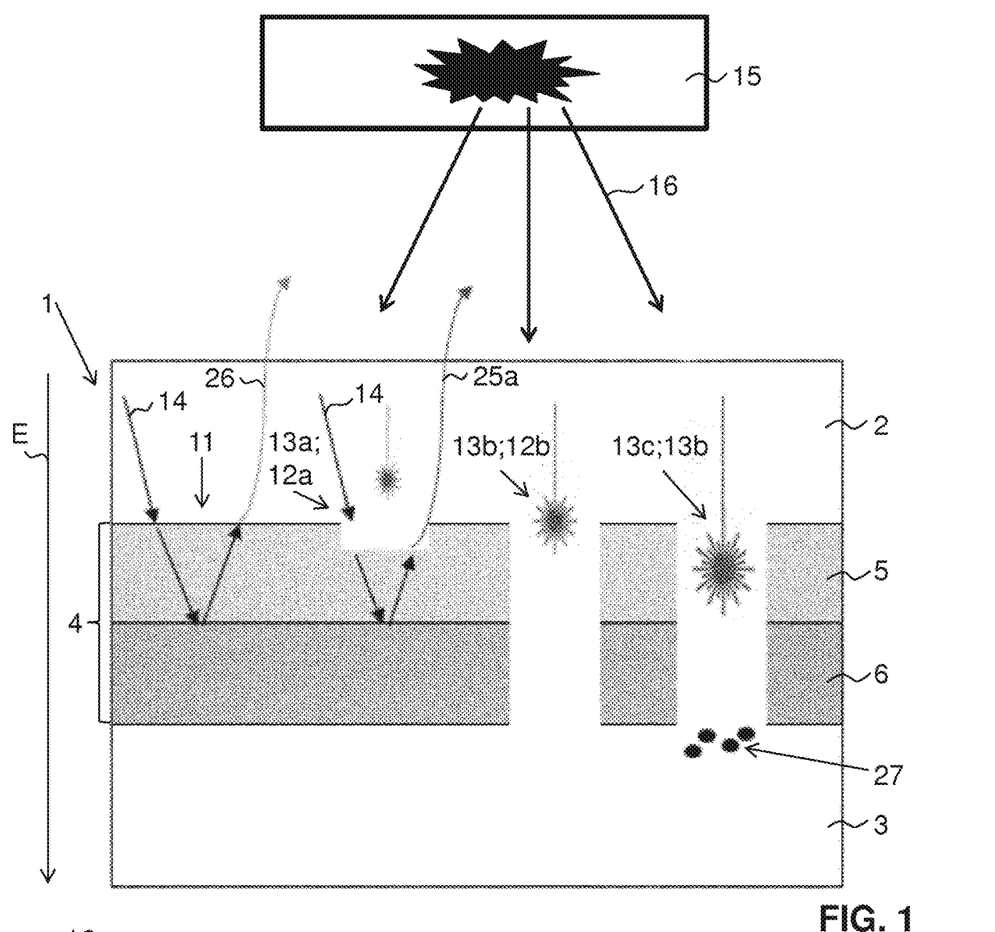
FIG. 1 shows a schematic representation of a data carrier according to a first embodiment during a selective laser ablation process.
Figure 2:
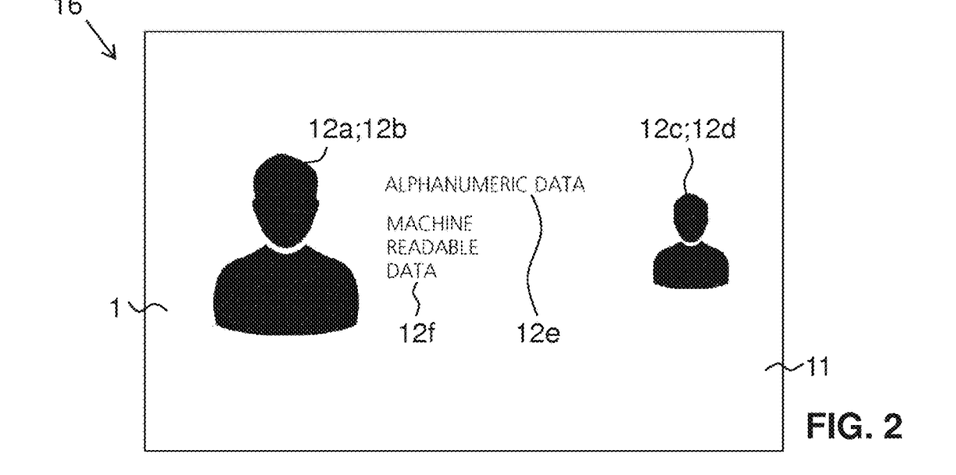
FIG. 2 shows a plan view of a security document comprising a data carrier according to a further embodiment after a selective laser ablation process.

The data carrier 1 according to FIG. 1 comprises a cover layer 2, a base layer 3 and an information layer arrangement 4 arranged there between. The information layer arrangement 4 comprises a first information layer 5 and a second information layer 6, wherein the first information layer 5 is arranged after the cover layer 2 and the second information layer 6 is arranged after the first information layer 5 and before the base layer 3 when seen along an extension direction E. Here, the first information layer 5 is directly attached to the cover layer 2 and the second information layer 6 is further directly attached to the base layer 3. That is, no further layers such an adhesive layer is arranged between these layers. The cover layer 2 and the base layer 3 are made from plastics, here from polycarbonate (PC) or polyethylene terephthalate (PET). The cover layer 2 is transparent and the base layer 3 can be transparent, white or colored, respectively. Moreover, it is conceivable to add laser absorbing additives to a transparent or white base layer 3, as it is the case in the present example. Here, said laser absorbing additives 27 are particle-shaped and embedded in the base layer 3 in a region where the entire information layer arrangement 4 has been laser-ablated in a first step. In a second step, said laser absorbing additives are irradiated with radiation of an appropriate wavelength and intensity such that said laser absorbing additives are blackened. These laser absorbing additives 27 can correspond to nanoparticles of metal oxides and their blackening due to the absorption of laser energy, i.e. their carbonization, is a state of the art method for the creation of greyscale (or black) laser-marking in transparent plastics the skilled person is aware of. In this way further information can be generated in the data carrier 1. Or in other words, the blackened particles add black color and more contrast to the data carrier 1. The first information layer 5 corresponds to a dielectric layer such as a $SiO_2$, $Al_2O_3$, $CeF_3$, $ZrO_2$, $CeO_2$, ZnS, $TiO_2$, $SiO_xN_y$ layer or combinations thereof. The second information layer 6 corresponds to a metallic layer such as a Al, Cu, Au, Ag, Ti layer. Thus, the first and the second information layer 5, 6 differ in their optical properties, i.e. in their refractive index and their absorption and reflection behaviors.

FIG. 1 further depicts a radiation source in the form of a laser 15 which emits radiation in the form of laser radiation 16. In the present example three radiation units are emitted from the radiation source 15, wherein these radiation units impinge on different locations on the data carrier 1. It should be noted that the simultaneous emission of these three radiation units serves as an illustration only. In reality, different radiation units 16 from one single laser 15 are emitted subsequently. From this figure it should be understood that laser radiation 16, which impinges on the data carrier 1, selectively ablates material from the data carrier 1 and thereby creates recesses 13a, 13b, . . . in the data carrier. Since the cover layer 2 is made from a non-absorbing plastics which does not absorb impinging laser radiation 16 but mainly transmits the laser energy, the laser radiation 16 passes through said cover layer 2 without ablation. However, when the laser radiation 16 impinges on the information layer arrangement 4, the information layer arrangement 4 is selectively laser ablated. The laser ablation depends on the intensity of the laser radiation, wherein a laser beam of low intensity results in a partial ablation of the first information layer 5 forming a first recess 13a and a laser beam of strong intensity results in a full ablation of the first and the second information layer forming a second and a third recess 13b, 13c. The region of the first recess 13a is referred to as a first modified region 12a of the information layer arrangement 4, the region of the second recess 13b is referred to as a second modified region 12b of the information layer arrangement 4 and the region of the third recess 13c is referred to as a third modified region 12c of the information layer system 4. The other regions of the information layer arrangement 4 which were not laser ablated are referred to as unmodified region 11.

The thickness along the extension direction E of the overall information layer arrangement 4 in the unmodified region 11 is preferably about 1000 nm, wherein the first information layer 5 and the second information layer 6 in said unmodified region 11 have a thickness of about 30-900 nm. In the region of the first recess 13a, the first information layer 5 has a thickness of about 500-700 nm. That is, the thickness of the first information layer 5 in the first modified region 12a is different from the thickness of the first information layer 5 in the unmodified region 11. Due to the different refractive indices between the first and the second information layer 5, 6 and due to the at least partially transparent and dielectric material of the first information layer 5, radiation 14 e.g. from the surroundings that impinges on the unmodified region 11 of the information layer arrangement 4 is reflected from the data carrier 1 according to a reflection spectrum 26, which reflection spectrum 26 is in terms of its reflection maxima and/or its reflection wavelengths different from a reflection spectrum 25a that is generated by the radiation 14 impinging on the first modified region 12a and being reflected therefrom.

Hence, in the present case the information provided in the data carrier 1 by means of the modified and unmodified regions can be made visible to an observer of the data carrier 1 by means of incident radiation 14 such as day light or an artificial light source such as a light bulb. The incident radiation 14 thus comprises a continuous spectrum of light of different wavelengths. This results in a data carrier 1 having an appearance in the unmodified region 11 that differs from the appearance in the first modified region 12a. In this case the thickness of the first information layer 5 has been used to adjust the interference phenomena and as a result the appearance of the data carrier 1.

As already mentioned various embodiments of data carriers 1 can be generated depending on the number of information layers 5, 6, . . . and their properties such as their optical properties e.g. their refractive index, color appearance, absorption behavior, reflection behavior, etc. and as a result also their physical quantities, e.g. their thickness, as well as the number of, the arrangement of and the particular shape of the modified and unmodified regions various. For example, in FIG. 2 a security document 16 in the form of an ID card comprising a data carrier 1 is shown, wherein the data carrier 1 comprises personalized data 12a, 12b; 12c, 12d in the form of images of the ID card owner as well as alphanumeric data 12e and machine-readable data 12f. The alphanumeric data could correspond to the name, the birth date, height, eye-color etc. of the owner and the machine-readable data could correspond to a barcode carrying further information. Although it is not evident from FIG. 2, the just-mentioned properties of the information layer arrangement and the specific generation of modified regions make these data possible in color. A selection of further possible embodiments of data carriers 1 is discussed below.

Figure 3:
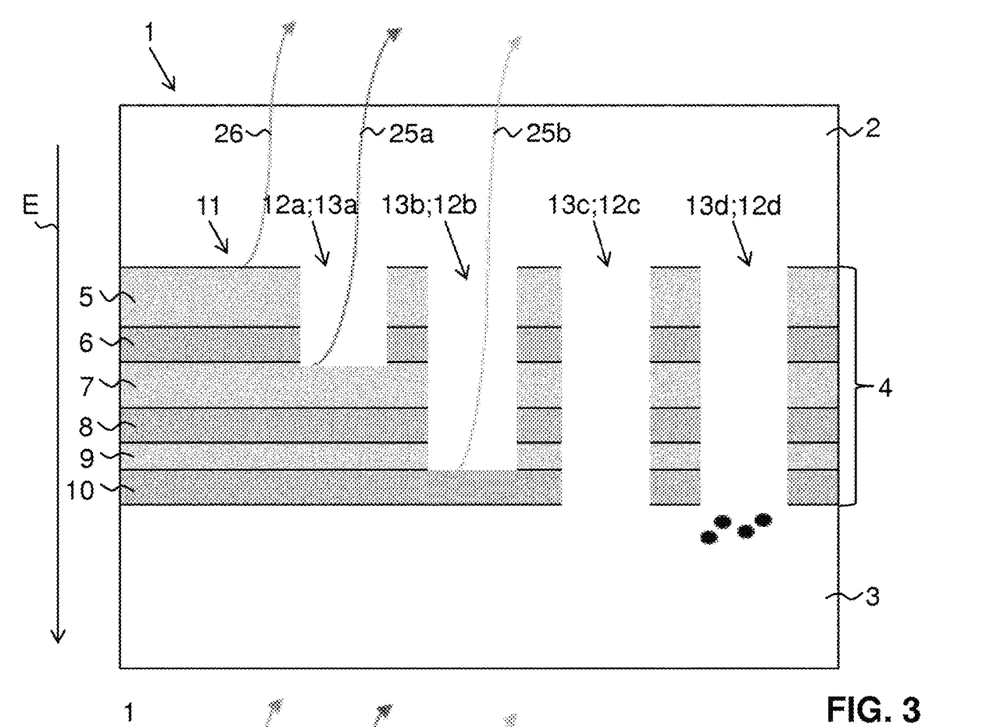
FIG. 3 shows a schematic representation of a data carrier according to a further embodiment after a selective laser ablation process.

The data carrier 1 shown in FIG. 3 comprises six information layers that are arranged on top of each other. With respect to the extension direction E the first, third and fifth layer information layers 5, 7, 9 correspond to transparent layers that differ in their thicknesses and possibly also in their refractive indices. Conceivable materials for these layers are $SiO_2$, $Al_2O_3$, $CeF_3$, $ZrO_2$, $CeO_2$, $ZnS$, $TiO_2$, $SiO_xN_y$, or combinations thereof.

The second, fourth and sixth information layers 6, 8, 10 correspond to metallic layers that are highly reflective and have laser absorbing properties. Conceivable materials for these layers are Al, Cu, Au, Ag, Ti or combinations thereof. The information layer arrangement 4 comprises four modified regions. A first modified region 12a comprises a recess 13a that extends completely through the first and the second information layer 5, 6, a second modified region 12b comprises a recess 13b that completely extends through the first, second, third, fourth and fifth information layer 5, 6, 7, 8, 9, and the third and the fourth modified regions 12c, 12d in each case comprise a recess 13c, 13d that completely extends through all information layers. In the unmodified region 11 the thickness of the first information layer 5 is larger than the thickness of the third 7 and the fifth information layer 9. The thickness of the third information layer 7 is in turn larger than the thickness of the fifth information layer 9. This is in contrast to the thickness of the metallic layers, i.e. the second, fourth and six information layers 6, 8, 10, which all have the same thickness here. This information layer arrangement 4 is again embedded within a cover layer 2 and a base layer 3, wherein the cover layer 2 is a transparent PC or PET substrate and the base layer 3 is a transparent, white or colored PC or PET substrate. FIG. 3 further evidences that light or radiation that impinges on the unmodified region 11 will be reflected from the unmodified region 11 with a reflection spectrum 26 being different from a reflection spectrum 25a constituted of reflected light or radiation from the first modified region 12a, which spectra 26, 25a are again different from the reflection spectrum 25b reflected from the second modified region 12b. This again leads to a data carrier 1 having different appearances, namely different colors.

Figure 4:
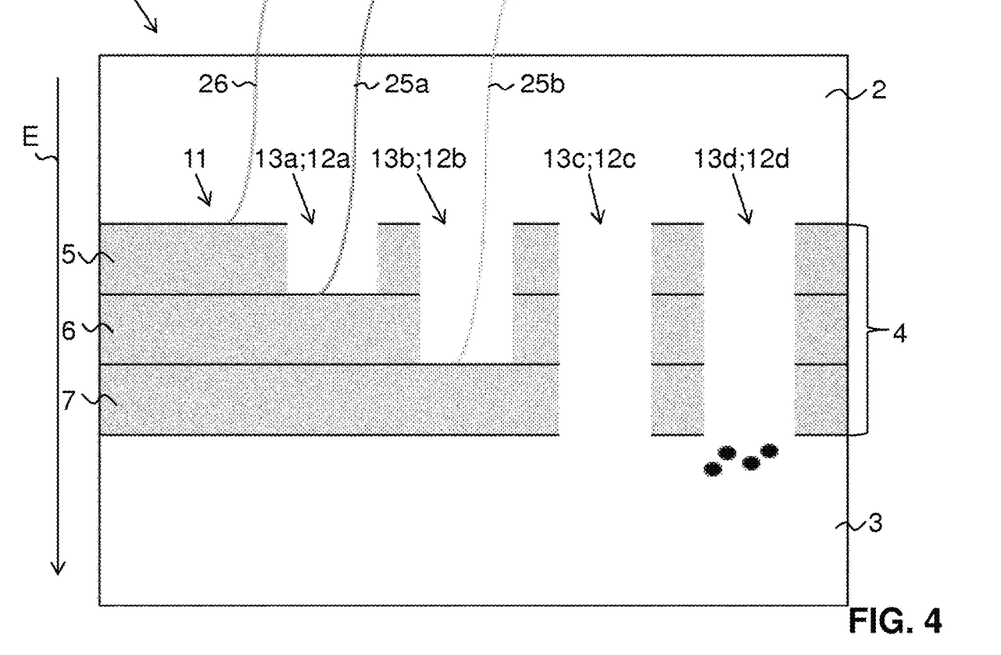
FIG. 4 shows a schematic representation of a data carrier according to a further embodiment after a selective laser ablation process.

In FIG. 4 a data carrier 1 is shown that has an information layer arrangement 4 comprised of three information layers 5, 6, 7. These information layers correspond to metal compounds such as TiN, TiCN, CrN, ZrN, TiZrN, ZrCN, TiC, TiCrN, AlTiN, TiAlN, diamond like carbon or combinations thereof. In the present example each information layer has the same thickness. By selective laser ablation a first modified region 12a with a recess 13a extending completely through the first information layer 5, a second modified region 12b with a recess 13b extending completely through the first and the second information layer 5, 6, and a third and a fourth modified region 12c, 12d with in each case a recess 13c, 13d extending completely through all information layers is formed. Due to the different absorption behavior of these information layers the data carrier 1 has a different appearance. In fact, light or radiation impinging on the unmodified region 11 is reflected with a reflection spectrum 26 being different from the reflection spectrum 25a of the first modified region 12a and the reflection spectrum 25b of the second modified region 12b. The information layer arrangement 4 of this data carrier 1 is likewise embedded within a transparent PC or PET cover layer 2 and a transparent or white or colored PC or PET base layer 3.

FIGS. 5a, 6a, 7a and 8a depict data carriers 1 having different information layer systems 4 prior to a laser ablation and FIGS. 5b, 6b, 7b and 8b depict these data carriers 1 after they were subject to selective laser ablation. Each data carrier 1 comprises a transparent PC or PET cover layer 2 and a transparent or white or colored PC or PET base layer 3.

Figure 5A:
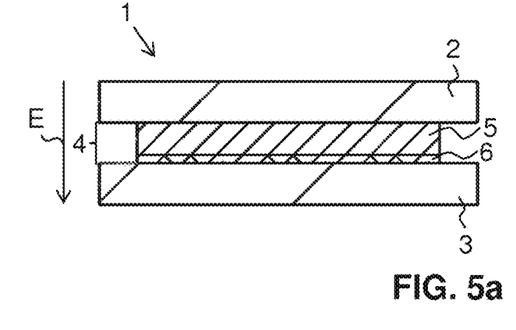
FIG. 5*a* shows a schematic representation of a data carrier according to a further embodiment before a selective laser ablation process.
Figure 5B:
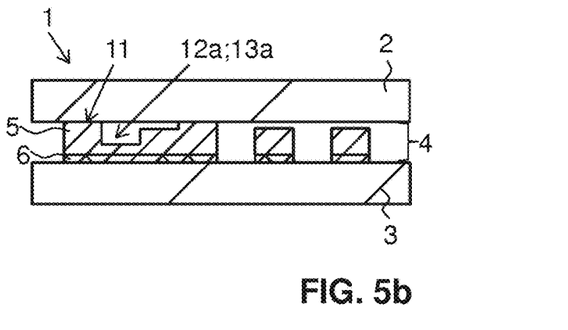
FIG. 5*b* shows a schematic representation of the data carrier according FIG. 5*a* after a selective laser ablation process.

The information layer system 4 of the data carrier according to FIGS. 5a and 5b comprises a first information layer 5 made from an at least partially transparent and dielectric material such as $SiO_2$, $Al_2O_3$, $CeF_3$, $ZrO_2$, $CeO_2$, $ZnS$, $TiO_2$, $SiO_xN_y$, or combinations thereof. This layer is again used for producing interference phenomena such as described above. For the reason of simplicity this layer is in the following referred to as interference layer. The second information layer 6 arranged below the first information layer 5 corresponds to a reflective metallic layer for example made of Al, Cu, Au, Ag, Ti or combinations thereof. For the reason of simplicity this layer is in the following referred to as reflective layer. Some of these layers are then selectively laser ablated, wherein different modified regions 12a, . . . are created that are capable of reflecting incident light with different wavelengths.

Figure 6A:
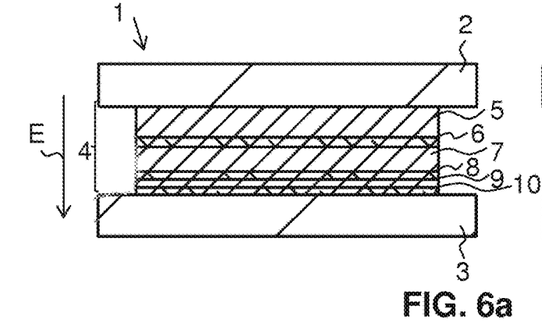
FIG. 6a shows a schematic representation of a data carrier according to a further embodiment before a selective laser ablation process.
Figure 6B:
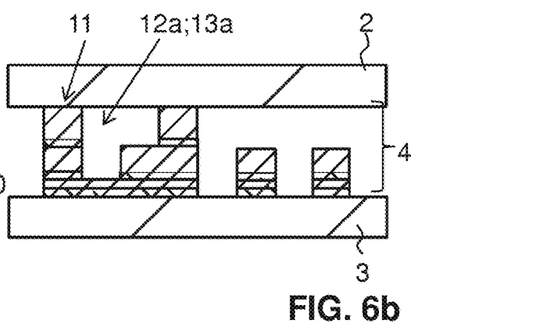
FIG. 6b shows a schematic representation of the data carrier according FIG. 6a after a selective laser ablation process.

The information layer system 4 of the data carrier 1 according to FIGS. 6a and 6b comprises six information layers, wherein the first, third and fifth information layer 5, 7, 9, corresponds to an interference layer and the second, fourth and six information layer 6, 8, 10 corresponds to a reflective layer. Some of these layers are then selectively laser ablated, wherein different modified regions 12a, . . . are created that are capable of reflecting incident light with different wavelengths.

Figure 7A:
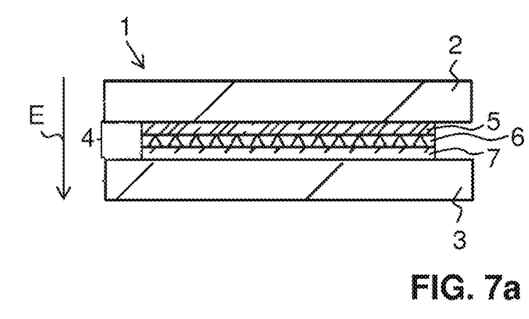
FIG. 7a shows a schematic representation of a data carrier according to a further embodiment before a selective laser ablation process.
Figure 7B:
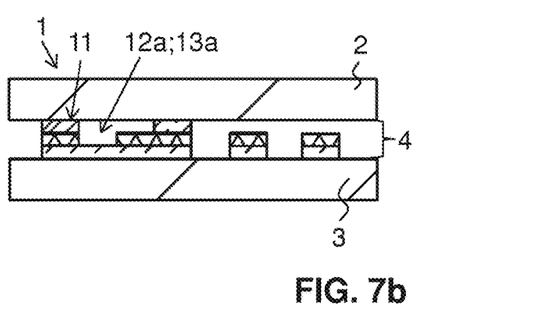
FIG. 7b shows a schematic representation of the data carrier according FIG. 7a after a selective laser ablation process.

The information layer system 4 of the data carrier according 1 to FIGS. 7a and 7b comprises three information layers 5, 6, 7, which all correspond to hard material layers or ceramic layers TiN, TiCN, CrN, ZrN, TiZrN, ZrCN, TiC, TiCrN, AlTiN, TiAlN, diamond like carbon or combinations thereof, for example. Some of these layers are then selectively laser ablated, wherein different modified regions 12a, . . . are created that are capable of reflecting incident light with different wavelengths.

Figure 8A:
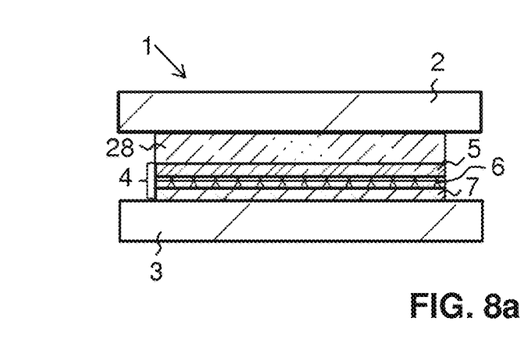
FIG. 8a shows a schematic representation of a data carrier according to a further embodiment before a selective laser ablation process.
Figure 8B:
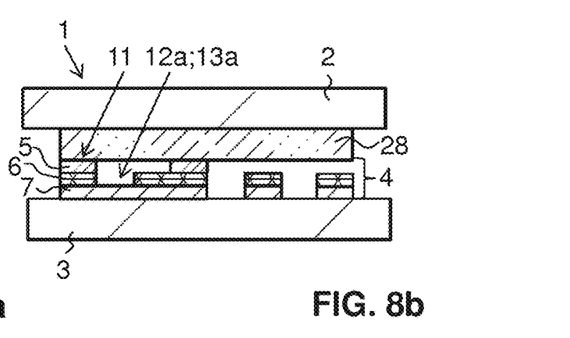
FIG. 8b shows a schematic representation of the data carrier according FIG. 8a after a selective laser ablation process.

The data carrier 1 according to FIGS. 8a and 8b differs from the data carrier 1 according to FIGS. 7a and 7b only in that it further comprises an adhesive layer 28. Said adhesive layer 28 is arranged between the information layer arrangement 4, more precisely on the first information layer 5, and the cover layer 2. The adhesive layer here serves the purpose of strengthening the cohesion between the information layer arrangement 4 and the cover layer 2. As becomes evident from FIG. 8b, the adhesive layer 28 remains mostly intact also after the selective laser ablation of the information layer arrangement 4. Or in other words, the adhesive layer 28 is not mainly affected by laser radiation that selectively generates recesses 13a, . . . and thus modified regions 12a, . . . in the information layer arrangement 4. It should be noted that such an adhesive layer 28 could likewise be present between the information layer arrangement 4 and the base layer 3 and/or between one or more of the information layers 5, 6, . . . of the information layer arrangement.

It should be understood that the embodiments shown and described herein represent only a few examples. However, arbitrary combinations of information layers are conceivable which can be laser processed in various ways. The present invention thus allows the creation of data carriers having a wide variety of appearances.

Figure 9:
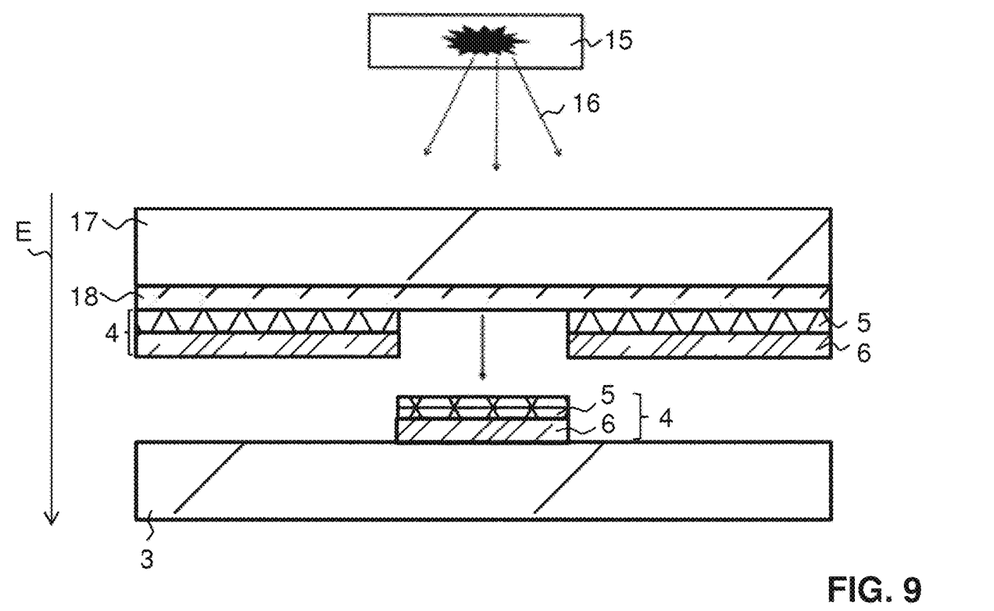
FIG. 9 shows a schematic representation of a partial coating of a data carrier according to a first variant.
Figure 10:
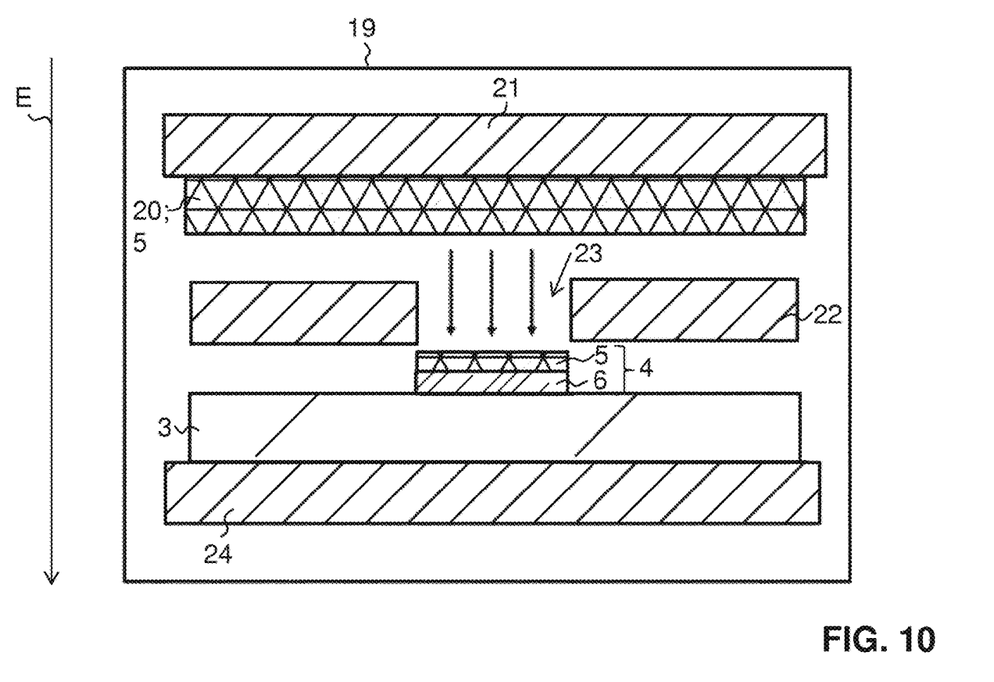
FIG. 10 shows a schematic representation of a partial coating of a data carrier according to a further variant.

FIGS. 9 and 10 illustrate two different possibilities of a partial coating of a data carrier 1 according to the invention.

In FIG. 9 a partial coating by means of a so-called laser-induced-forward-transfer process is shown, wherein at least one region of the information layer arrangement 4 is transferred onto the base layer. To this end, in a first step a carrier layer 17 is provided onto which a release layer 18 and an information layer arrangement 4 comprising a first information layer 5 and a second information layer 6 are applied in a vapor deposition process as described above. In a second step, laser radiation is irradiated onto the carrier layer 17 from a side opposite to the side on which the just-mentioned layers are arranged, wherein in the region of the laser irradiation a section of the information layer arrangement 4 is transferred from the carrier layer 17 to the base layer 3. Subsequently, a cover layer can be arranged on the transferred section of the information layer system (not shown).

In FIG. 10 a partial coating by using a physical mask is shown. To this end a vacuum chamber 19 is provided, in which a target 20 is arranged on a target holder 21. The targets correspond to the materials to be used in the data carrier. In addition, a masking device 22 with at least one aperture 23 as well as a base layer 3 arranged on a base layer holder 24 are arranged within the vacuum chamber 19, wherein one or more particles that are extracted from the target 20 are subsequently transferred from the target device 21 to the base layer 3 through the aperture 23 in the masking device 22. In the present example, the target 20 corresponds to the first information layer 5, a section of which is applied to a section of the second information layer 6 that has already been applied to the base layer 3 in a previous step. After partially coating the base layer 3 by means of one or more information layers transferred from the target holder 21 through the one or more apertures 23 of the masking device 22, a cover layer can be arranged on the transferred section of the information layer system 4 (not shown).

LIST OF REFERENCE SIGNS

| | |
|---|---|
| 1 | data carrier |
| 2 | cover layer |
| 3 | base layer |
| 4 | information layer arrangement |
| 5 | first information layer |
| 6 | second information layer |
| 7 | third information layer |
| 8 | fourth information layer |
| 9 | fifth information layer |
| 10 | sixth information layer |
| 11 | unmodified region |
| 12a, . . . | modified region |
| 13a, . . . | recess |
| 14 | incident radiation |
| 15 | laser |
| 16 | security document |
| 17 | carrier layer |
| 18 | release layer |
| 19 | vacuum chamber |
| 20 | target |
| 21 | target device |
| 22 | masking device |
| 23 | aperture |
| 24 | base layer holder |
| 25 | reflection spectrum |
| 26 | reflection spectrum |
| 27 | laser absorbing additives |
| 28 | adhesive layer |
| E | extension direction |

The invention claimed is:

1. A data carrier comprising:
a cover layer;
a base layer located beneath the cover layer; and
an information layer arrangement,
   wherein the information layer arrangement is arranged between the cover layer and the base layer, and
   wherein the information layer arrangement comprises at least two information layers, wherein a first information layer of the at least two information layers is arranged beneath the cover layer and a second information layer of the at least two information layers is arranged beneath the first information layer along an extension direction extending from the cover layer to the base layer,
wherein the first information layer and the second information layer have different optical properties, and
   in that the information layer arrangement has an unmodified region and at least one modified region, the at least one modified region having at least one recess extending at least partially into the first information layer along the extension direction,
   wherein the at least one modified region is configured to reflect incident electromagnetic waves whereby a first reflection spectrum is generated,
   wherein the unmodified region is configured to reflect said incident electromagnetic waves whereby a second reflection spectrum is generated, and
   wherein the first reflection spectrum is different from the second reflection spectrum.

2. The data carrier according to claim 1, wherein the different optical properties are at least one of a different refractive index, a different color appearance, a different absorption behavior, a different reflection behavior, or combinations thereof.

3. The data carrier according to claim 1, wherein the second information layer and the first information layer in the unmodified region or the first information layer in the at least one modified region have a same thickness along the extension direction; or wherein the second information layer and the first information layer in the unmodified region or the first information layer in the at least one modified region have a different thickness along the extension direction.

4. The data carrier according to claim 1, wherein the recess extends completely through the first information layer.

5. The data carrier according to claim 1, wherein the first information layer and/or the second information layer have a refractive index in a range of 1 to 2.5.

6. The data carrier according to claim 1, wherein the information layer arrangement has at least one further modified region, the at least one further modified region having at least one further recess extending at least partially into the first information layer along the extension direction, wherein the at least one further recess extends into the information layer arrangement to a same extent as the at least one recess; or wherein the at least one further recess extends to a lesser extent or to a further extent into the information layer arrangement as the at least one recess.

7. The data carrier according to claim 1, wherein the first information layer and the second information layer are made of an at least partially reflective material.

8. The data carrier according to claim 1, wherein the first information layer and/or the second information layer is made of one or more metals or one or more metal-compounds, of one or more metals selected from Al, Cu, Au, Ag, Ti or combinations thereof and/or one or more metal-compounds selected from TiN, TiCN, CrN, ZrN, TiZrN, ZrCN, TiC, TiClN, AlTiN, TiAlN, diamond or combinations thereof and/or of one or more compounds selected from $SiO_2$, $Al_2O_3$, $CeF_3$, $ZrO_2$, $CeO_2$, ZnS, $TiO_2$, $SiO_xN_y$, or combinations thereof.

9. The data carrier according to claim 1, wherein the information layer arrangement comprises a third information layer or more information layers, the third information layer or the more information layers being arranged beneath the second information layer along the extension direction.

10. The data carrier according to claim 1, further comprising an adhesive layer being arranged between the cover layer and the information layer arrangement and/or between the base layer and the information layer arrangement, or wherein the information layer arrangement is immediately adjoining the cover layer and/or the base layer.

11. The data carrier according to claim 1, wherein the recess extends at least partially into the second information layer along the extension direction.

12. The data carrier according to claim 1, wherein the first information layer is made of a dielectric and at least partially transparent material and the second information layer is made of an at least partially reflective material.

13. The data carrier according to claim 1, wherein the first information layer is made of a dielectric.

14. The data carrier according to claim 13, wherein the first information layer is made of an at least partially transparent material.

15. The data carrier according to claim 1, wherein the first information layer and the second information layer are made of a dielectric.

16. The data carrier according to claim 15, wherein the first information layer and the second information layer are made of an at least partially transparent material.

17. The data carrier according to claim 1, wherein the first information layer and/or the second information layer have a refractive index in a range of 1.4 to 2.

18. A security document, comprising:
a data carrier having:
a cover layer;
a base layer located beneath the cover layer; and
an information layer arrangement,
wherein the information layer arrangement is arranged between the cover layer and the base layer, and
wherein the information layer arrangement comprises at least two information layers, wherein a first information layer of the at least two information layers is arranged beneath the cover layer and a second information layer of the at least two information layers is arranged beneath the first information layer along an extension direction extending from the cover layer to the base layer,
wherein the first information layer and the second information layer have different optical properties, and
in that the information layer arrangement has an unmodified region and at least one modified region, the at least one modified region having at least one recess extending at least partially into the first information layer along the extension direction,
wherein the at least one modified region is configured to reflect incident electromagnetic waves whereby a first reflection spectrum is generated,
wherein the unmodified region is configured to reflect said incident electromagnetic waves whereby a second reflection spectrum is generated, and
wherein the first reflection spectrum is different from the second reflection spectrum.

19. A method of producing a data carrier, the method comprising the steps of:
providing a cover layer, a base layer and an information layer arrangement comprising at least a first information layer and a second information layer, the first information layer and the second information layer having different optical properties, and
providing the information layer arrangement with at least one modified region, wherein the at least one modified region is provided with at least one recess extending at least partially into the first information layer along an extension direction extending from the cover layer to the base layer,
wherein the at least one modified region is configured to reflect incident electromagnetic waves whereby a first reflection spectrum is generated,
wherein the unmodified region is configured to reflect said incident electromagnetic waves whereby a second reflection spectrum is generated, and
wherein the first reflection spectrum is different from the second reflection spectrum.

20. The method according to claim 19, wherein the at least one recess is generated by at least one laser, and wherein the at least one laser at least partially ablates the first information layer along the extension direction.

21. The method according to claim 19, wherein the first information layer and/or the second information layer are generated by vapor deposition.

22. The method according to claim 19, further comprising the step of at least partially transferring at least one region of the information layer arrangement onto the base layer in a laser-induced-forward-transfer process, or
  wherein the method further comprises the step of providing a masking having at least one aperture, wherein at least one section of the first information layer and/or the second information layer is applied through said at least one aperture.

23. The method according to claim 19, wherein the first information layer and/or the second information layer are generated by sputtering, evaporation, or chemical vapor deposition.

24. The method according to claim 19, wherein the first information layer and/or the second information layer are generated by reactive sputtering.

\* \* \* \* \*